United States Patent [19]

Cook et al.

[11] 4,398,429
[45] Aug. 16, 1983

[54] FORCE PLATFORM CONSTRUCTION AND METHOD OF OPERATING SAME

[75] Inventors: Nathan H. Cook, Cambridge; Forest J. Carignan, Bedford, both of Mass.

[73] Assignee: Advanced Mechanical Technology, Inc., Newton, Mass.

[21] Appl. No.: 260,040

[22] Filed: May 4, 1981

[51] Int. Cl.³ .............................................. G01L 5/16
[52] U.S. Cl. .............................. 73/862.04; 73/862.65; 128/782
[58] Field of Search ................ 73/172, 862.04, 862.54, 73/862.38, 862.62, 862.65; 128/782; 177/134, 211

[56] References Cited

U.S. PATENT DOCUMENTS

| | | | |
|---|---|---|---|
| 2,611,266 | 9/1952 | Wiancko | 73/862.62 |
| 2,646,236 | 7/1953 | Williams | 177/134 |
| 3,501,951 | 3/1970 | Giles | 73/862.62 |
| 3,587,761 | 6/1971 | Merriam et al. | 177/211 X |

FOREIGN PATENT DOCUMENTS 757211 9/1956 United Kingdom ............. 73/862.65

OTHER PUBLICATIONS

BLH Electronics, Inc. Bulletin 002, Sep. 1967, pp. 1–6.

*Primary Examiner*—Charles A. Ruehl

*Attorney, Agent, or Firm*—Hamilton, Brook, Smith & Reynolds

[57] ABSTRACT

A force measuring apparatus includes a platform construction on which forces may be exerted, as for example, by an individual stepping upon a top plate of the platform construction. Apparatus of this nature is commonly referred to in the art as a "Biomechanics Platform", and may include a bottom plate, a top plate deformable by forces exerted thereon and a plurality of load cell members arranged to yieldably support the top plate in spaced relation to the bottom plate. The load cells are constructed with strain ring means having strain gage elements suitably supported thereon, and the cells further include composite anchoring means for connecting the top plate with strain rings of respective load cells in a unique manner. Each of the composite anchoring means includes a compliant or elastic member which is arranged to transmit, at any given time, an entire load exerted between the top plate and its respective load cell. Also included in each composite anchoring means are retaining elements arranged to engage with a respective elastic member as well as adjacent top plate and strain ring portions. The elastic member is further characterized by a compliance with respect to rotation and lateral translation of the top plate greater than the compliance of the entire load cell structure, thereby to eliminate to a very large extent transmission of erroneous force signals resulting from deformation of the top plate.

3 Claims, 13 Drawing Figures

ERROR IN HORIZONTAL FORCE VERSUS GAGE PLACEMENT ANGLE, θ

FORCE PLATFORM CONSTRUCTION AND METHOD OF OPERATING SAME

BACKGROUND OF THE INVENTION

Measurement of forces by means of a force platform apparatus is well-known in the art and in one desirable form the force platform means may be employed in measuring human dynamics and is commonly referred to as a "Biomechanics Platform". The field of application of force platforms including biomechanics platforms has been rapidly widened in recent time and extends into fields of specialized medical application, sports application, running dynamics and the like.

Strain signals induced by forces and torque applied to a platform such as a biomechanics platform are electrically sensed and then transmitted to receiver means to provide a suitable record. It is essential that a high degree of selectivity and accuracy be achieved in the sensing and transmission of strain signals. In this connection, difficulty has, in some instances, been experienced due to the fact that erroneous strain signals may be sensed and transmitted. Erroneous signals thus sensed are commonly referred to as "cross talk" and may detract materially from the accuracy of measurements obtained.

There are various forms of cross talk and the invention is particularly concerned with one form of cross talk which may be defined as erroneous strain signals resulting from deformation of a top plate due to applied loads. This type of cross talk may be principally experienced by the horizontal force sensing channels, but may also be experienced in vertical force channels and in moment sensing channels.

Various proposals have been made for dealing with the problem of cross talk induced by deformation of a top plate member, but none have been effective and there presently exists a need for improved accuracy in force measurements using force platforms.

SUMMARY OF THE INVENTION

The present invention relates in general to force measuring apparatus and in particular to a force platform construction of the class employed in measuring human dynamics and commonly referred to as a "Biomechanics Platform". Such a biomechanics platform, in one desirable embodiment, includes top and bottom plates supported at their corners by load cell structures in which strain rings have strain gages received thereon. The load cell structures may yieldably support the top plate in spaced relation to the bottom plate.

It is a chief object of the invention to provide, in general, improved force measuring platforms, and to devise load cell structures which, when interposed between the top plate and bottom plate of a force platform, are capable of more accurately sensing and transmitting to receiver means strain signals induced by forces exerted against the top plate of the platform.

Another object is to provide a means of anchoring load cell structures to a top plate of a force platform, which means effectively isolates the load cells from deformation forces of the top plate and greatly reduces the occurrence of cross talk.

The foregoing objectives may be realized to a very desirable extent by combining with a force platform load cell structures which include strain ring means having strain gages suitably located thereon and composite anchoring means attached between the top plate of the force platform and respective strain rings of each of the load cell structures. Each of the composite anchoring means includes (a) an elastic or compliant member arranged to transmit, at any given time, an entire load exerted between the top plate and individual load cells, and (b) retaining elements for securing a respective resilient or compliant member in predetermined relationship to the top plate and to respective strain ring members. Utilization of compliant or elastic means constructed and arranged as disclosed operates to reduce or eliminate to a very desirable extent transmission of erroneous force signals resulting from deformation of a top plate member and tending to cause cross talk.

DETAILED DESCRIPTION OF THE INVENTION

Figure 1:
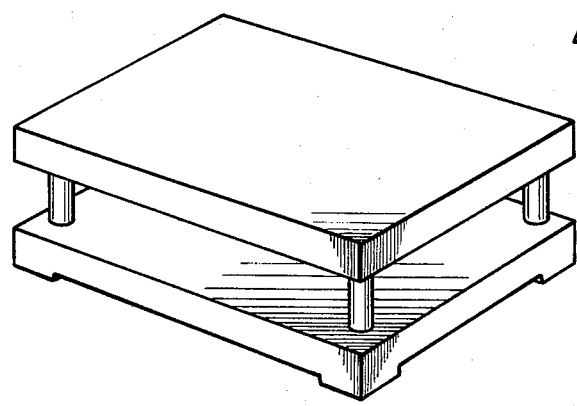
FIG. 1 is a perspective view illustrating a force platform of the class with which the invention is concerned.

FIG. 1 illustrates generally a force plate construction wherein a top plate and a bottom plate are located in spaced apart relation by load cell structures arranged between corners of the top and bottom plates.

Figure 2:
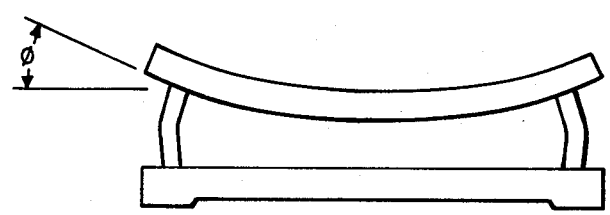
FIGS. 2 and 3 are diagrammatic views illustrating a deformed top plate of a force platform and deformed top plate supporting means.

FIG. 2 is intended to illustrate diagrammatically bending of a top plate and to suggest diagrammatically how internally generated forces may be transmitted to load cells so that the cells tend to sense forces which are extraneous to the forces applied to the top plate.

Figure 3:
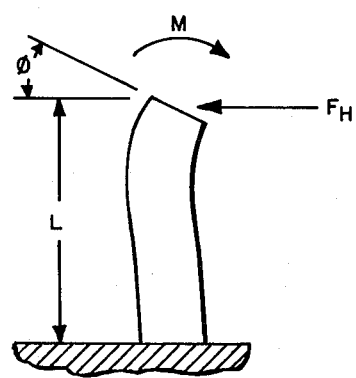

As is illustrated schematically in FIG. 2, bending of the top plate causes the top end of a load cell to rotate through an angle $\phi$. There is no significant lateral displacement of the top of a load cell due to bending of the top plate, since it is anchored to the top plate. As illustrated in FIG. 3, under the aforesaid constraints, a bending moment M and a lateral force $F_H$ are applied to the load cell as a result of its rotation through angle $\phi$. The magnitude of the horizontal force, $F_H$, and the moment, M, may be calculated from simple beam theory to be $$F_H = 6EI\phi/L^2; \quad M = 4EI\phi/L$$

where E is Young's modulus of elasticity, I is the moment of inertia of a load cell with respect to its horizontal axis, L is the height of the load cell, and $\phi$ is the angle of rotation of the top of the load cell.

For large force platforms, such as those used in the study of biomechanics, the angle $\phi$ can be of sufficient magnitude to produce lateral forces, $F_H$, which are of appreciable magnitude in comparison to the forces applied to the top plate. The desired remedy is to isolate the load cells from the deflections of the top plate which cause spurious forces $F_H$. While this might appear to be a simple matter, there are constraints which made this goal difficult to achieve. For one, it is desirable that the entire force plate assembly be as rigid as possible in order to maintain high natural frequencies of vibration. The use of bearings, such as ball joints, to prevent rotation of the load cells is unacceptable, since rolling or sliding friction leads to unacceptable non-linearity and hysteresis. Thus, the means of anchoring each load cell to the top plate must be purely elastic, but of sufficient rigidity or stiffness to maintain high natural frequency of the assembly.

If the anchoring means must be elastic, it is clear that while the rotation of the load cell due to bending of the top plate may be reduced by providing a rotationally compliant anchoring means, it cannot be totally eliminated.

If it is not possible to completely eliminate rotation of the top anchoring point of a load cell, the question arises whether the resulting lateral force, $F_H$, can be reduced. FIG. 3 illustrates the deformation of a load cell whose top is rotated through an angle $\phi$, but in which there is no constraint to lateral deflection. In this case, the bending moment, M, is given by $EI\phi/L$, which is ¼ as great as the case depicted in FIG. 3; and since there is no lateral constraint, the lateral force, $F_H$, is zero.

While it is no more possible to achieve the ideal of complete lateral compliance than it is to achieve complete rotational compliance, it is evident from the foregoing argument that the provision of lateral compliance in addition to rotational compliance will significantly reduce the magnitude of horizontal force, $F_H$, induced by rotation of the top of a load cell.

Figure 11:
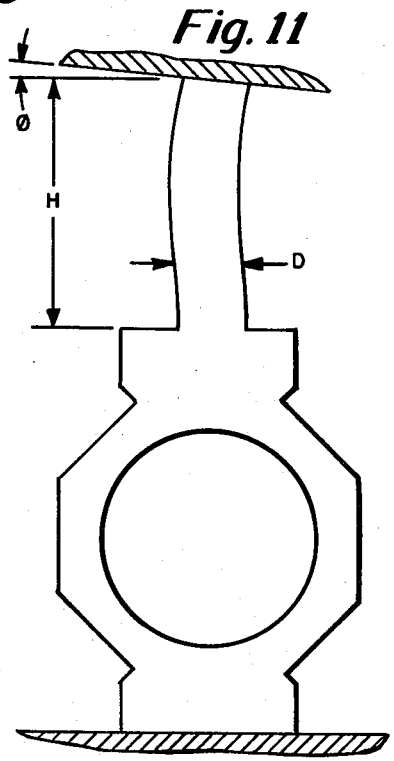
FIG. 11 is a diagrammatic view illustrating a strain ring and a compliant or elastic member associated therewith.

The principle by which horizontal cross-talk due to bending of the top plate may be reduced is illustrated schematically in FIG. 11 for the case in which the load cell consists of the type well-known in the art. The top boss of the strain ring is anchored to the top plate through an elastic post which is substantially more compliant to rotation about a horizontal axis and to lateral displacement than is the load cell itself.

For the case of a cylindrical post of diameter D and height H, and assuming the strain ring of the load cell to be far more rigid than the compliant post, then the magnitude of induced horizontal force, $F_H$, is approximately:

$$F_H = 3\pi E\phi D^4/32H^2$$

Figure 12:
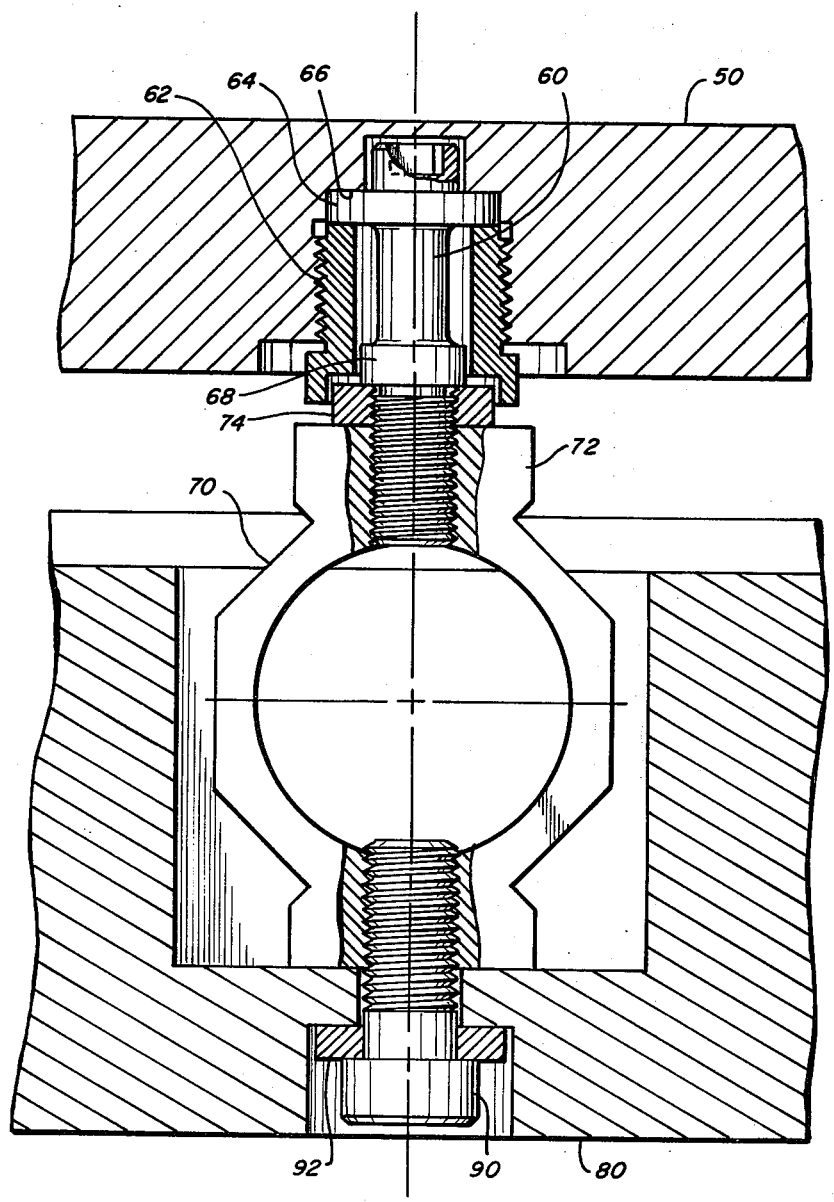
FIG. 12 is a vertical cross-sectional view taken through top and bottom plates of a force platform and further illustrating an octagonal type strain ring, elastic element and retainer members for securing the elastic member between the top plate and the strain ring.
Figure 13:
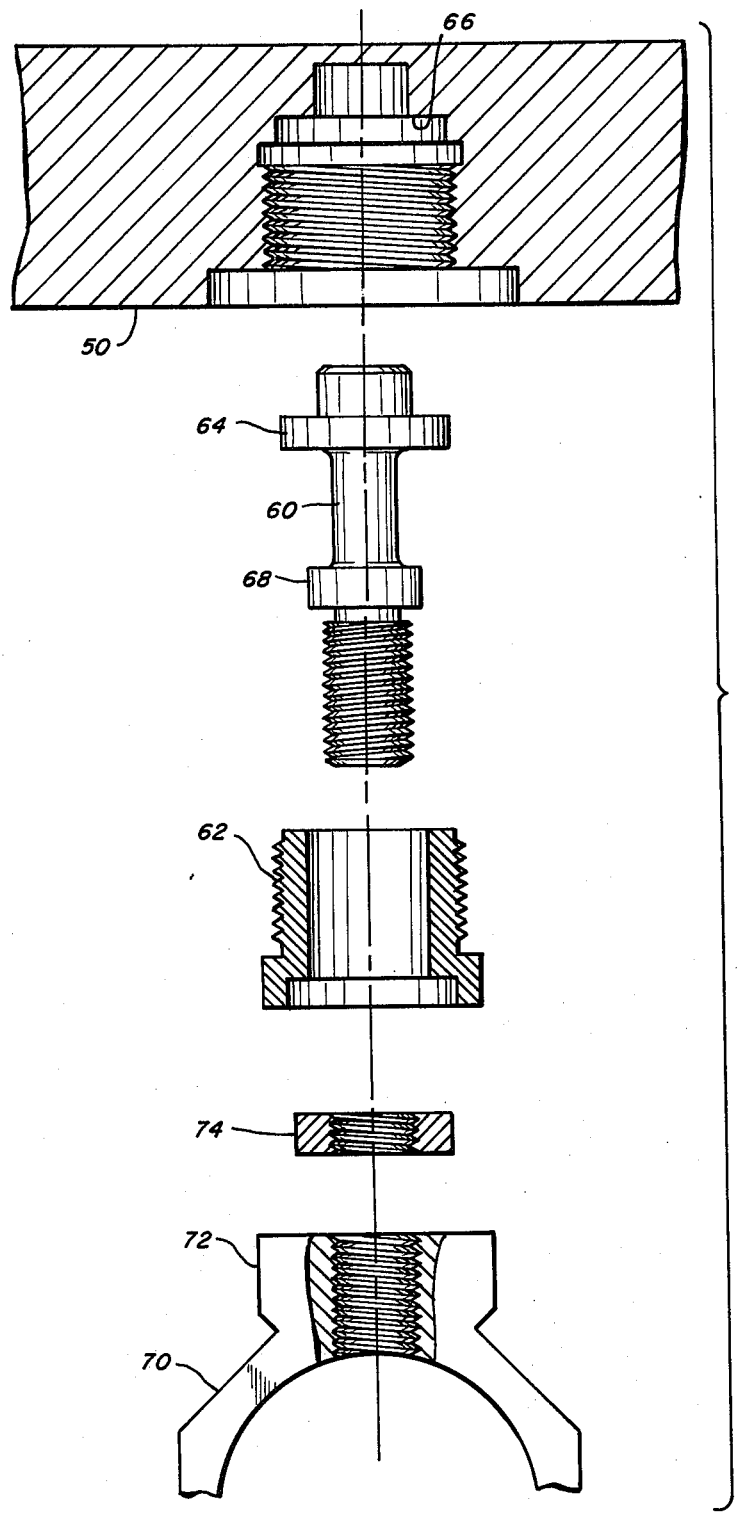
FIG. 13 is an exploded view illustrating some of the parts of FIG. 12 in spaced relationship to one another.

This principle of isolating the load cell from deflections of the top plate may be embodied in various forms which may be obvious to those skilled in the art. One embodiment that has been found to be particularly advantageous is illustrated in FIG. 12, and in FIG. 13 which shows an exploded view of the component parts. Octagonal strain ring 70 is elastically anchored to top plate 50 by elastic post 60 which is screwed into top boss 72 of strain ring 70.

It will be noted that elastic post 60 is formed with a top flange 64 and a lower flange 68 so that there is defined an intermediate portion of the elastic post which is of a reduced diameter.

In order to secure the lower end of elastic post 60 in strain ring 70 the top of elastic post 60 may be furnished with an Allen head socket S so that it may be turned into threaded engagement with the strain ring. The elastic post 60 is secured in top plate 50 by a threaded cylindrical part 62 which is in spaced relation to the portion of the elastic post of reduced diameter, and which clamps top flange 64 against a recessed shoulder 66 formed in the top plate 50. The strain ring 70, in a preferred form, is made of a material having lower yield strength than the elastic post 60. Hardened washer 74 will be threaded around the elastic post 60 and employed to distribute a bearing load over a wider area of the top surface of the projecting boss portion 72 of ring 70, than would be the case if flange 68 were to bear directly against the surface of the boss 72. Washer 74 is preferably formed with loose fitting internal threads in order that it may be threadably engaged with elastic post 60 so that its bearing area is maximized.

The bottom plate 80 is recessed to provide a cap screw receptacle and strain ring 70 may be solidly fastened to bottom plate 80 by means including a socket head cap screw 90 and load distributing hardened washer 92 as shown in FIG. 12.

As noted above, the combination of a relatively compliant or elastic post with other forms of retaining means in a force platform construction may be employed. It may also be desired to utilize a load cell structure such as that now disclosed with various forms of strain ring devices and particularly with strain rings in which strain gages are suitably placed to enable the elastic post means to provide optimum results.

Figure 8:
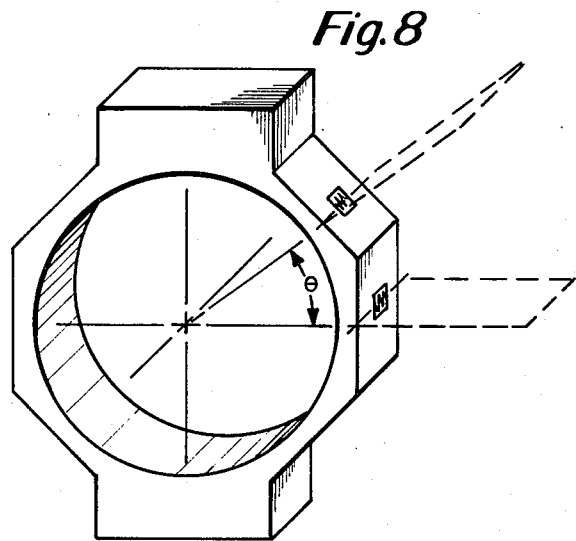
FIG. 8 is a perspective view of a strain ring similar to that indicated in FIG. 7 and further illustrating strain gage means mounted thereon together with an angular relationship of one of the strain gages with respect to a horizontal plane.
Figure 9:
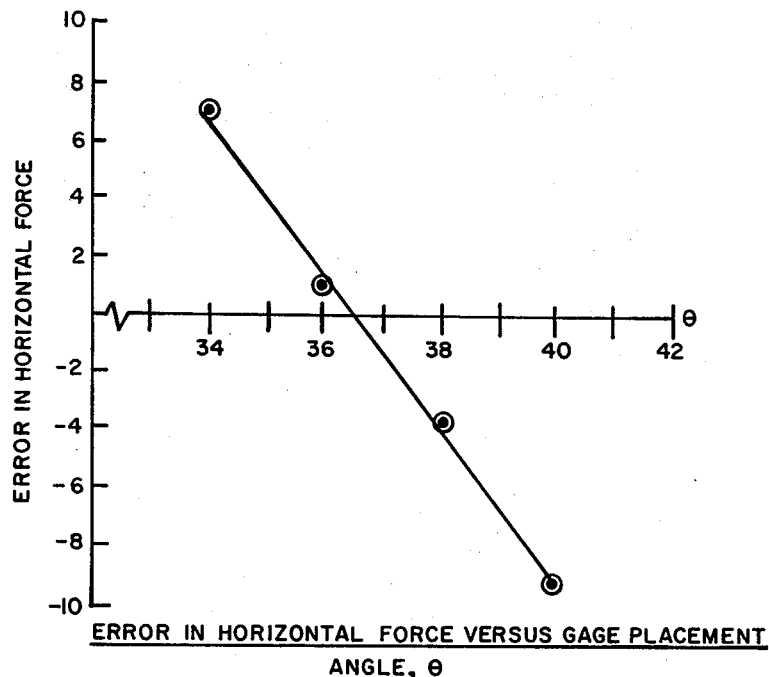
FIG. 9 is a diagram illustrating errors in horizontal force versus gage placement angle $\theta$.
Figure 10:
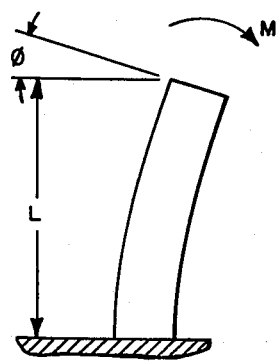
FIG. 10 is another diagrammatic view illustrating a bent moment.

In one preferred embodiment of the invention there may be employed a strain ring of the type illustrated in FIG. 8 wherein placement of the strain gage elements is specifically controlled.

Figure 4:
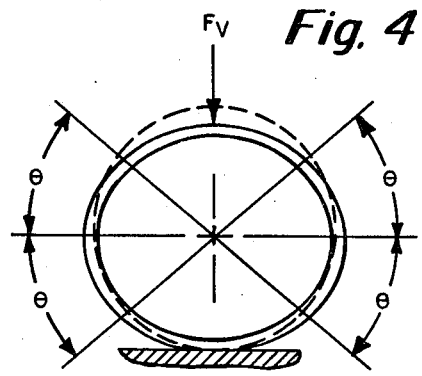
FIGS. 4 and 5 are diagrammatic views of strain ring members which have been subjected to forces acting to produce deformation.
Figure 5:
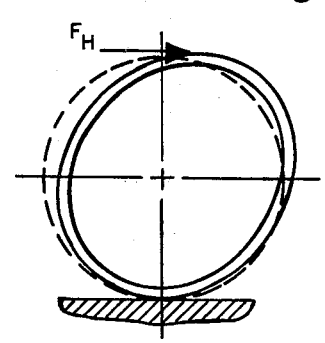

For many years, circular "strain-rings" have been used to measure forces. The measurement principle is illustrated in FIGS. 4 and 5. FIG. 4 shows the deflection of ring under a vertical load, $F_v$. Maximum strains occur at the horizontal and vertical mid points of the ring, while zero-strain nodes occur at points above and below the horizontal mid-plane, indicated by the angle $\theta$. Here, the zero-strain nodes occur at the horizontal mid-plane. It follows, therefore, that a strain gage placed at the horizontal mid-plane will be sensitive to vertical forces, and insensitive to horizontal forces; and a strain gage placed at an angle $\theta$ will be sensitive to horizontal forces and insensitive to vertical forces. Cook (N. H. Cook and E. Rabinowicz, "Physical Measurement and Analysis" Addison-Wesley, 1963; Pgs. 160-164) has shown that the value of $\theta$ for a ring is equal to 50.4°.

Figure 6:
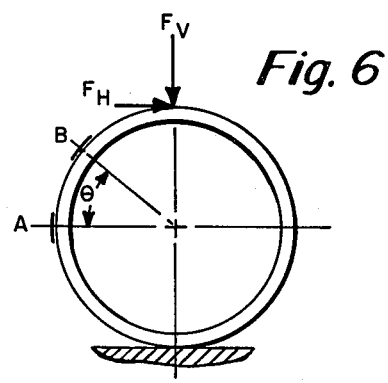
FIG. 6 is a view of a strain ring element illustrating angular relationships.
Figure 7:
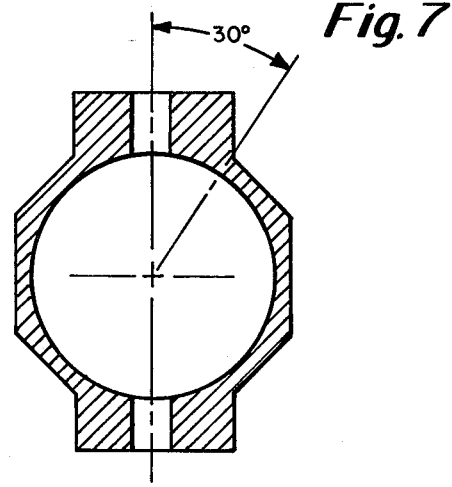
FIG. 7 is a detail cross-sectional view of a strain ring of octagonal cross-sectional configuration.

This is the principle of the multi-component strain ring, which is illustrated in FIG. 6, wherein strain gage A is the vertical force sensitive gage and strain gage B is the horizontal sensitive gage. The main drawback of such a strain ring is that it is difficult to attach it to a force plate in such a way that it has high lateral stiffness. In order to increase lateral stiffness, Cook developed the "octagonal strain ring" as shown in FIG. 7. This configuration has been used successfully for many years in relatively small dynamometers.

Based on early photo-elastic studies of octagonal rings, it was recommended that the gages used to measure the horizontal forces be placed at an angle $\theta = 40°$ above the horizontal. The gage placement is critical; if properly placed these gages will be strained when $F_H$ is applied, but will not be strained when $F_V$ is applied.

In spite of the past analytic and empirical studies relating to gage placement, problems with cross talk have been experienced; when $F_V$ is applied, we read a fictitious force, $F_H$.

In a recent attempt to resolve these cross talk problems, a unique finite-element computer analysis was made for the octagonal ring. It was found that for the geometry where the edges of the upper and lower "bosses" were at 30° from the vertical as shown in FIG. 7, the optimum angle $\theta$ was really between 36° and 37° degrees depending on ring thickness. As shown in FIG. 8, this is the angle that prior teaching set at 40°.

We claim:

1. A force measuring plate apparatus for measuring multi axis force components, said apparatus comprising a bottom plate, a top plate being of a construction such that it is deformable by forces exerted thereagainst, load cell structures for deformably supporting the top plate in spaced relation to the bottom plate, said load cell structures comprising strain ring means having strain gages suitably located to provide for multi axis force measurement thereon and composite anchoring means connected between the top plate and the strain rings of each of the load cell structures, each of said composite anchoring means including an elastic post member which is arranged to provide for all of the multi axis forces transmitted between the top plate and respective load cell structures passing through the elastic post member, and retaining elements for securing the elastic post members in suitable relationship with respect to the top plate and the strain ring means, and said elastic post members of the cell structures being of a compliance with respect to rotation about a horizontal axis greater than the compliance of respective load cell structures thereby to appreciably eliminate transmission of erroneous internally induced multi axis strain signals resulting from deformation of the top plate.

2. The axis measuring apparatus of claim 1 in which the strain ring means of each of the load cell structures is solidly secured in the bottom plate.

3. The multi axis apparatus of claim 2 in which the strain rings of each load cell structure extend into the space between the top plate and bottom plate and are formed with a threaded opening in which one end of the elastic post member of each load cell structure is threadably engaged and said retaining elements consisting of a threaded washer located around a lower end of each elastic post member and a cylindrical sleeve arranged in threaded engagement with the top plate for clamping the elastic post member against the top plate.

* * * * *